Dec. 29, 1959 W. N. JONES 2,919,416
TRANSISTOR VARIABLE FREQUENCY OSCILLATOR EMPLOYING
AN INDUCTOR WITH A CORE OF VARIABLE PERMEABILITY
Filed March 14, 1956
Fig. I.
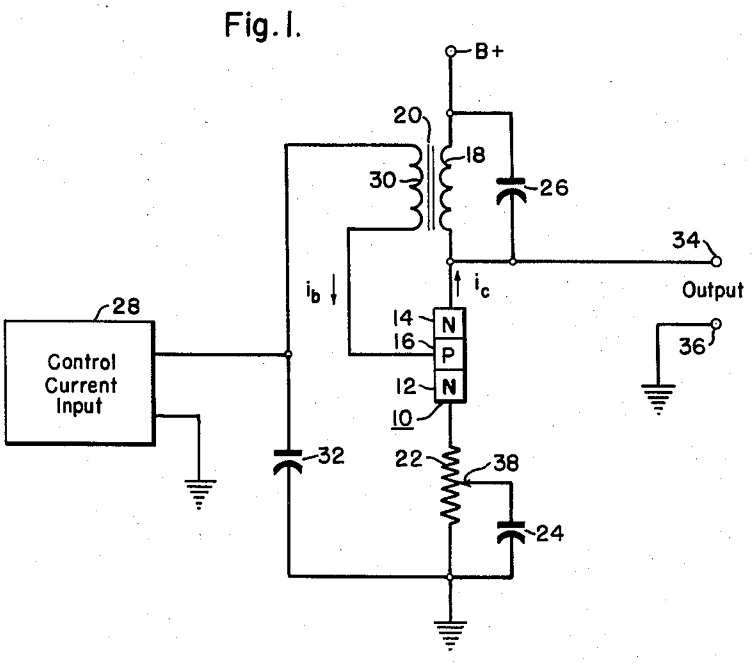
Fig. 2.
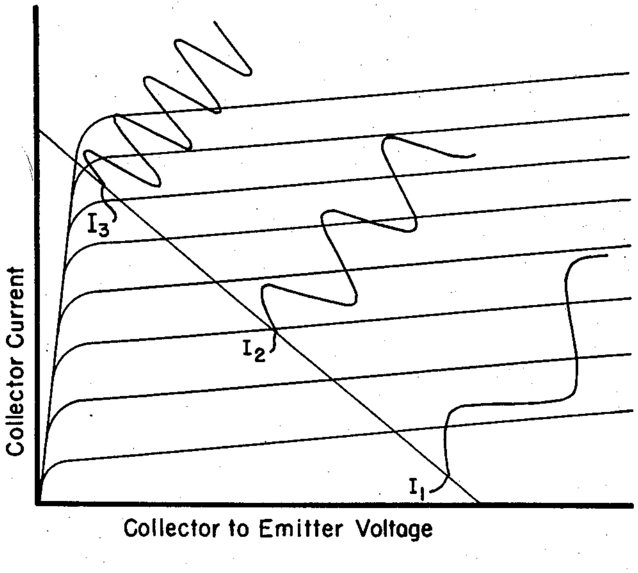
WITNESSES:
Bernard R. Gieguey
Leon J. Jaza
INVENTOR
Wesley N. Jones
BY F. H. Murray
ATTORNEY United States Patent Office 2,919,416
Patented Dec. 29, 1959

2,919,416

TRANSISTOR VARIABLE FREQUENCY OSCILLATOR EMPLOYING AN INDUCTOR WITH A CORE OF VARIABLE PERMEABILITY

Wesley N. Jones, Severna Park, Md., assignor to Westinghouse Electric Corporation, East Pittsburgh, Pa., a corporation of Pennsylvania Application March 14, 1956, Serial No. 571,532

6 Claims. (Cl. 332—29)

This invention relates to transistor oscillators, and more particularly to a transistor oscillator having an output frequency dependent upon the magnitude of an input control current.

It is an object of this invention to provide a new and improved transistor oscillator. More specifically, an object of the invention resides in the provision of means in a transistor oscillator for varying output frequency as a function of an input control current.

In accordance with the invention, hereinafter described, I provide a tickler feedback oscillator in which the feedback voltage is delivered through a transformer having a core formed from double ferrite material. In parallel with one of the windings of this transformer is a capacitor which, together with the said one winding of the transformer, forms a tank circuit for the oscillator. The properties of the double ferrite material are such that by varying a control current through the other winding of the transformer the resultant frequency of the tank circuit can be made to change, thereby varying the output frequency of the oscillator.

The above and other objects and features of the invention will become apparent from the following detailed description taken in connection with the accompanying drawings which form a part of this specification and in which:

Figure 1 is a schematic circuit diagram of one embodiment of the invention, and

Fig. 2 is a graphic illustration of the operational characteristics of the circuit shown in Fig. 1.

Referring to Fig. 1, the circuit shown comprises an N–P–N junction transistor 10 having an emitter 12, collector 14 and base 16. Collector 14 is connected to a source of positive driving potential (B+) through the secondary winding 18 of transformer 20; while the emitter 12 is connected to ground through a resistor 22, part of which is bypassed by capacitor 24. A capacitor 26 in parallel with secondary winding 18 forms a parallel resonant tank circuit for the oscillator.

In order to bias the base 16 with respect to emitter 12 whereby the transistor may conduct, a source of control current 28 is provided having one output terminal grounded. The other terminal of the current source 28 is connected through primary winding 30 of transformer 20 to base 16. A capacitor 32 couples this same output terminal to ground. Output signals on terminals 34 and 36 are taken from the oscillator between collector 14 and ground, substantially as shown.

As will be understood, in a tickler feedback oscillator of the type shown, a part of the output current is fed back to the input in regenerative fashion. The base current $i_b$ is amplified by the transistor in the grounded-emitter configuration. The collector current $i_c$ is then approximately $$i_c \approx -i_b\left[\frac{a}{1-a}\right]$$

where $a$ is the amplification factor of the transistor. The minus sign indicates a reversal in phase. The transformer 20 changes the amplitude of the current and changes its phase by an additional 180° so that it is fed back to the input in the proper phase. The current in winding 30 of transformer 20 is fed back to the input through capacitor 32.

The output frequency of the oscillator is determined by the resonant frequency of the tank circuit of elements 18 and 26. If transformer 20 is constructed such that the inductance of winding 18 changes as the current through winding 30 changes, then the output frequency of the oscillator will change also. A transformer having a core formed from double ferrite material such as Ferroxcube 3 will produce this result. The properties of double ferrite material are fully described in "Ferro-Magnetism," R. M. Bozorth, D. Van Nostrand Co., Inc., New York, 1951. In this reference it can be seen that the permeability of double ferrite material changes radically as a function of the applied magnetic field. Consequently, the inductance of winding 18 and the resonant frequency of the tank circuit can be made to vary over a wide range as the current through winding 30 is varied.

Operation of the circuit may best be understood by reference to Fig. 2 which shows the operating characteristics of the transistor 10. At the lowest desired frequency some minimum value of control current $I_1$ from source 28 is maintained for transistor operation which permits the current through the transistor to swing to almost zero on the negative half cycle. At an intermediate frequency a greater control current $I_2$ is maintained which shifts the transistor operating point to a location which requires a larger direct current through inductance 18. At this point, however, the greater control current through winding 30 changes the permeability of the core of transformer 20 and the inductance of winding 18. Consequently, the resonant frequency of the tank circuit of elements 18 and 26 and the output frequency of the oscillator are increased. At the highest frequency the control current $I_3$ is maintained at a point such that the maximum current through the transistor on the positive half cycle is just short of saturation. At this point the permeability of the core of transformer 20 is changed to still a further degree by the increased control current and thus the output frequency is increased as shown in Fig. 2.

The amplitude of the output oscillations can be adjusted by varying the position of tap 38 on resistor 22. The unbypassed portion of resistor 22 changes the input impedance of the transistor for the oscillation component, thus changing that component of the base current. This, in turn, changes the amplitude of the oscillation component through the transistor and thus the output.

Although the invention has been described in connection with a certain specific embodiment it will be readily apparent to those skilled in the art that various changes in the embodiment and arrangement of parts can be made to suit requirements without departing from the spirit and scope of the invention. In this respect, it should be readily apparent that the N–P–N transistor 10 may be replaced by a P–N–P transistor with equal effectiveness. In the latter case, the polarities of the control current from source 28 and the driving potential B+ for the transistor will be reversed.

I claim as my invention:

1. A variable frequency oscillator comprising a transistor having an emitter, a collector and a base, a transformer having primary and secondary windings and a core formed from double ferrite material, a terminal adapted for connection to the positive side of a direct current voltage source the negative side of which is grounded, means including a capacitor in parallel with the secondary winding of said transformer for coupling said collector to said terminal, a source of direct current having a pair of output terminals one of which is grounded, means including the primary winding of said transformer for connecting the ungrounded terminal of said current source to said base, an impedance element connecting said emitter to ground, a capacitor coupling said ungrounded output terminal of the current source to ground, and means for deriving an output signal from said oscillator between said collector and ground.

2. A variable frequency oscillator comprising a transistor having an emitter, a collector and a base, a transformer having primary and secondary windings, said transformer being characterized by a change in the inductance of said secondary winding as a function of the magnitude of a direct current through said primary winding, a terminal adapted for connection to the positive side of a source of driving potential, a capacitor in parallel with said secondary winding for coupling said collector to said terminal, a source of direct current having a pair of output terminals, means including the primary winding of said transformer for connecting one of said output terminals to said base, and means including a capacitor coupling said emitter to said one output terminal.

3. A variable frequency oscillator comprising a transistor having an emitter, a collector and a base, a transformer having primary and secondary windings, said transformer being characterized by a change in the inductance of said secondary winding as a function of the magnitude of a direct current through said primary winding, a capacitor connected in parallel with said secondary winding, a connection between one side of said capacitor and said collector, a source of direct current, and means including the primary winding of said transformer for applying said source of direct current between the emitter and base of said transistor.

4. A variable frequency oscillator comprising a transistor having an emitter, a collector and a base, a transformer inductively coupling said collector and base, said transformer being characterized by a change in the inductance of one of its windings as a function of a direct current through the other of its windings, a source of variable direct current, and circuit means including the emitter and base of said transistor for applying said source of variable direct current to the other winding of said transformer.

5. A variable frequency oscillator comprising a transistor having an emitter, a collector and a base, a parallel resonant tank circuit connected to said collector, double ferrite material inductively associated with the inductance of said tank circuit, said double ferrite material being characterized by a change in permeability as a function of an applied magnetic field, means for applying a magnetic field to said double ferrite material, and means responsive to voltages developed across said inductance for periodically varying the voltage between the emitter and base of said transistor.

6. A variable frequency oscillator comprising a transistor having an emitter element, a collector element, and a base element, a parallel resonant tank circuit connected to one of said elements, double ferrite material inductively associated with the inductance of said tank circuit, said double ferrite material being characterized by a change in permeability as a function of an applied magnetic field, means for applying a magnetic field to said double ferrite material, and means responsive to voltages developed across said inductance for periodically varying the voltage across the other two elements of said transistor.

References Cited in the file of this patent

UNITED STATES PATENTS

| | | |
|---|---|---|
| 2,245,340 | Harvey | June 10, 1941 |
| 2,650,350 | Heath | Aug. 25, 1953 |
| 2,745,012 | Felker | May 8, 1956 |
| 2,748,274 | Pearlman | May 29, 1956 |
| 2,783,380 | Bonn | Feb. 26, 1957 |
| 2,801,341 | Jaffe et al. | July 30, 1957 |

OTHER REFERENCES

"Ferromagnetism," by Bozorth, Van Norstrand Co., New York, New York, published 1951, pages 247–249.